(12) United States Patent
Magenheimer (10) Patent No.: US 8,769,206 B2
(45) Date of Patent: Jul. 1, 2014

(54) METHODS AND SYSTEMS FOR IMPLEMENTING TRANSCENDENT PAGE CACHING

(75) Inventor: Daniel Magenheimer, Fort Collins, CO (US)

(73) Assignee: Oracle International Corporation, Redwood Shores, CA (US)

( * ) Notice: Subject to any disclaimer, the term of this patent is extended or adjusted under 35 U.S.C. 154(b) by 500 days.

(21) Appl. No.: 12/716,441

(22) Filed: Mar. 3, 2010

(65) Prior Publication Data

US 2010/0186011 A1 Jul. 22, 2010

Related U.S. Application Data

(63) Continuation-in-part of application No. 12/356,389, filed on Jan. 20, 2009.

(51) Int. Cl.
*G06F 13/00* (2006.01)
*G06F 13/28* (2006.01)

(52) U.S. Cl.
USPC .... 711/130; 711/165; 711/153; 711/E12.024; 718/104; 718/105

(58) Field of Classification Search
USPC .......... 711/130, 165, 153, E12.024; 718/104, 718/105
See application file for complete search history.

(56) References Cited

U.S. PATENT DOCUMENTS

| | | | |
|---|---|---|---|
| 6,026,474 A | 2/2000 | Carter et al. | |
| 2005/0262505 A1* | 11/2005 | Esfahany et al. | 718/1 |
| 2007/0156963 A1* | 7/2007 | Chen et al. | 711/130 |
| 2008/0229053 A1* | 9/2008 | Campini et al. | 711/203 |
| 2009/0055601 A1* | 2/2009 | McKenney et al. | 711/153 |
| 2010/0185817 A1 | 7/2010 | Magenheimer | |
| 2010/0268881 A1* | 10/2010 | Galchev et al. | 711/121 |
| 2011/0066597 A1 | 3/2011 | Mashtizadeh et al. | |
| 2012/0222052 A1 | 8/2012 | Magenheimer et al. | |

OTHER PUBLICATIONS

Jones, Stephen T., "Geiger: Monitoring the Buffer Cache in a Virtual Machine Environment," ASPLOS 2006, Oct. 21-25, 2006, pp. 14-24, San Jose, CA.

Waldspurger, Carl A., "Memory Resource Management in Vmware ESX Server," In Proc. Fifth Symposium on Operating Systems Design and Implementation (Soda 2002), Dec. 2002, pp. 1-14, Palo Alto, CA.

(Continued)

*Primary Examiner* — Edward Dudek, Jr.
(74) *Attorney, Agent, or Firm* — Kilpatrick Townsend & Stockton LLP (57) ABSTRACT

This disclosure describes, generally, methods and systems for implementing transcendent page caching. The method includes establishing a plurality of virtual machines on a physical machine. Each of the plurality of virtual machines includes a private cache, and a portion of each of the private caches is used to create a shared cache maintained by a hypervisor. The method further includes delaying the removal of the at least one of stored memory pages, storing the at least one of stored memory pages in the shared cache, and requesting, by one of the plurality of virtual machines, the at least one of the stored memory pages from the shared cache. Further, the method includes determining that the at least one of the stored memory pages is stored in the shared cache, and transferring the at least one of the stored shared memory pages to the one of the plurality of virtual machines.

20 Claims, 7 Drawing Sheets

(56) References Cited

OTHER PUBLICATIONS

Wong, Theodore M., "My cache or yours? Making storage more exclusive," USENIX Annual Technical Conference (USENIX 2002), Jun. 10-15, 2002, pp. 161-175, Monterey, CA.

Author Unknown, "RNA/MVX Memory Motion: bring RAM resources to the servers that need it most," RNA, 2010, 4 pages, retrieved on Dec. 9, 2011 from http://web.archive.org/web/20101011130905/http://rnanetworks.com/memory-motion.

Bugnion, et al., "Disco: Running Commodity Operating Systems on Scalable Multiprocessors," ACM Transactions on Computer Systems, vol. 15, No. 4, Nov. 1997, pp. 412-447.

Lim, Kevin, "Disaggregated Memory Architectures for Blade Servers," A dissertation submitted in partial fulfillment of the requirements for the degree of Doctor of Philosophy (Computer Science and Engineering) in the University of Michigan, 2010, 148 pages, Retrieved on Dec. 14, 2011 from http://www.eecs.umich.edu/~tnm/trev_test/dissertationsPDF/kevinL.pdf.

Lu, Pin et al., "Virtual Machine Memory Access Tracing with Hypervisor Exclusive Cache," USENIX Association, USENIX Annual Technical Conference 2007, pp. 29-43.

Tanenbaum, Andrew s., et al. "Distributed Systems Principles and Paradigms," 2002, 20 pages, Prentice Hall, New Jersey.

U.S. Appl. No. 12/356,389, filed Jan. 20, 2009, Office Action mailed Sep. 20, 2011, 25 pages.

U.S. Appl. No. 12/356,389, filed Jan. 20, 2009, 24 pages.

Bugnion, Edouard et al., "Disco: Running Commodity Operating Systems on Scalable Multiprocessors," ACM Transactions on Computer Systems, vol. 15, No. 4, Nov. 1997.

Lu, Pin et al., "Virtual Machine Memory Access Tracing with Hypervisor Exclusive Cache," Proceedings of the 2007 USENIX Annual Technical Conference, Jun. 17-22, 2007, Santa Clara, CA.

U.S. Appl. No. 12/356,389, filed Jan. 20, 2009, Final Office Action mailed Feb. 22, 2012, 15 pages.

* cited by examiner

METHODS AND SYSTEMS FOR IMPLEMENTING TRANSCENDENT PAGE CACHING

PRIORITY CLAIM

This application is a continuation-in-part of U.S. patent application Ser. No. 12/356,389, entitled METHODS AND SYSTEMS FOR IMPLEMENTING TRANSCENDENT PAGE CACHING, and filed on Jan. 20, 2009, which is incorporated by reference for any and all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to physical memory management in computer systems.

BACKGROUND

Presently, in computer systems, a large portion of physical memory is often used to store disk data that might possibly be used in the future; if it is not used, that memory is wasted or "idle". Similar methods are used in a virtualized computer system and, as a result, many virtual machines (VMs) may each have large amounts of idle memory. One method called "ballooning" allows idle memory from one VM (VM1) to be transferred to another VM (VM2), but ballooning has significant weaknesses, notably that it cannot respond rapidly enough to accommodate constantly changing demands in the computing environment, and it is difficult to determine the amount of memory that is needed by VM2 and that the memory can be safely surrendered by VM1. These deficiencies result in significantly reduced performance which limits the broad application of ballooning. Lastly, in a virtualized system large amounts of physical memory are often left unassigned to any specific VM—or left "fallow"—for short or long periods of time. Because of the large amounts of idle memory in VMs, the limitations of ballooning, and the large amount of memory left fallow in a virtualized system, physical memory in most virtualized computer systems in used inefficiently, incurring significant performance costs, capital costs (such as the purchase of unnecessary additional memory), and variable IT costs (i.e., floorspace, power, cooling, etc.). Hence, there is a need for improved methods and systems in the art of managing physical memory in virtualized computing environments.

BRIEF SUMMARY

Embodiments of the present invention are directed to a method of implementing transcendent page caching. The method includes establishing a plurality of virtual machines on a physical machine, managed and isolated from each other by a hypervisor. A hypervisor is system software that manages physical resources of a physical machine; divides and assigns those physical resources to one or more virtual machines as specified by a system administrator; creates an illusion for the operating environment running in each virtual machine that each is running on a separate physical machine; and isolates the virtual machines from each other to ensure no one virtual machine can accidentally or maliciously interfere with another virtual machine. Each of the plurality of virtual machines includes a private cache, and a portion of each of the private caches is used to create a shared cache maintained by a hypervisor. The method further includes storing memory pages in the plurality of virtual machines' private caches, and determining that at least one of the stored memory pages has been designated to be removed from one of the plurality of virtual machines' private caches.

Furthermore, the method includes delaying the removal of the at least one of the stored memory pages, storing the at least one of the stored memory pages in the shared cache, and requesting, by one of the plurality of virtual machines, the at least one of the stored memory pages from the shared cache. Further, the method includes determining that the at least one of the stored memory pages is stored in the shared cache, and transferring the at least one of the stored shared memory pages to the one of the plurality of virtual machines.

In an alternative embodiment, a machine-readable medium is described. The machine-readable medium may include instructions for implementing transcendent page caching. The machine-readable medium includes instructions for establishing a plurality of virtual machines on a physical machine. Each of the plurality of virtual machines includes a private cache, and a portion of each of the private caches is used to create a shared cache maintained by a hypervisor. The machine-readable medium further includes instructions for storing memory pages in the plurality of virtual machines' private caches, and determining that at least one of the stored memory pages has been designated to be removed from one of the plurality of virtual machines' private caches.

Furthermore, the machine-readable medium includes instructions for delaying the removal of the at least one of stored memory pages, storing the at least one of stored memory pages in the shared cache, and requesting, by one of the plurality of virtual machines, the at least one of the stored memory pages from the shared cache. Further, the machine-readable medium includes instructions for determining that the at least one of the stored memory pages is stored in the shared cache, and transferring the at least one of the stored shared memory pages to the one of the plurality of virtual machines.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1:
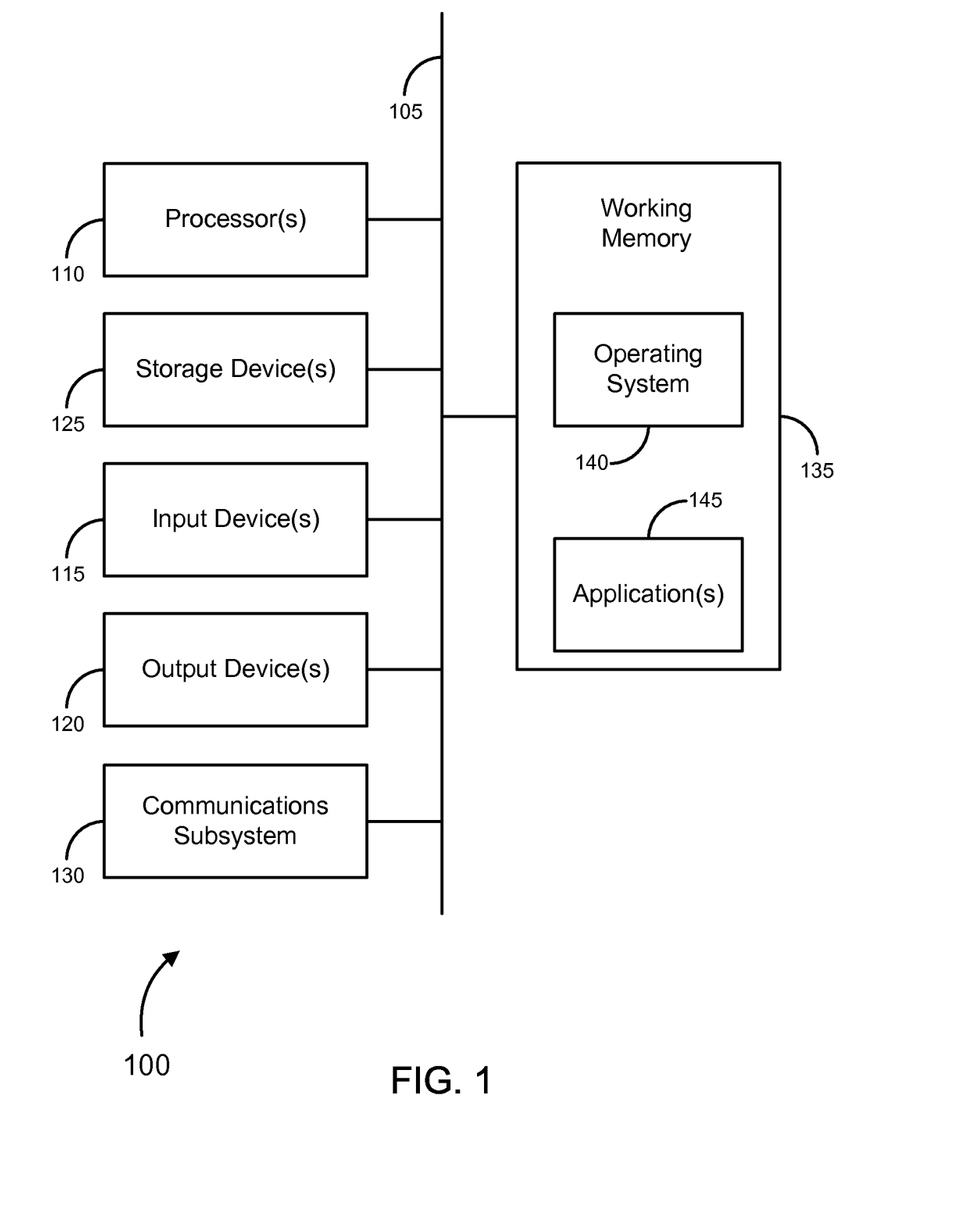
FIG. 1 is a generalized schematic diagram illustrating a computer system, in accordance with various embodiments of the invention.
Figure 5:
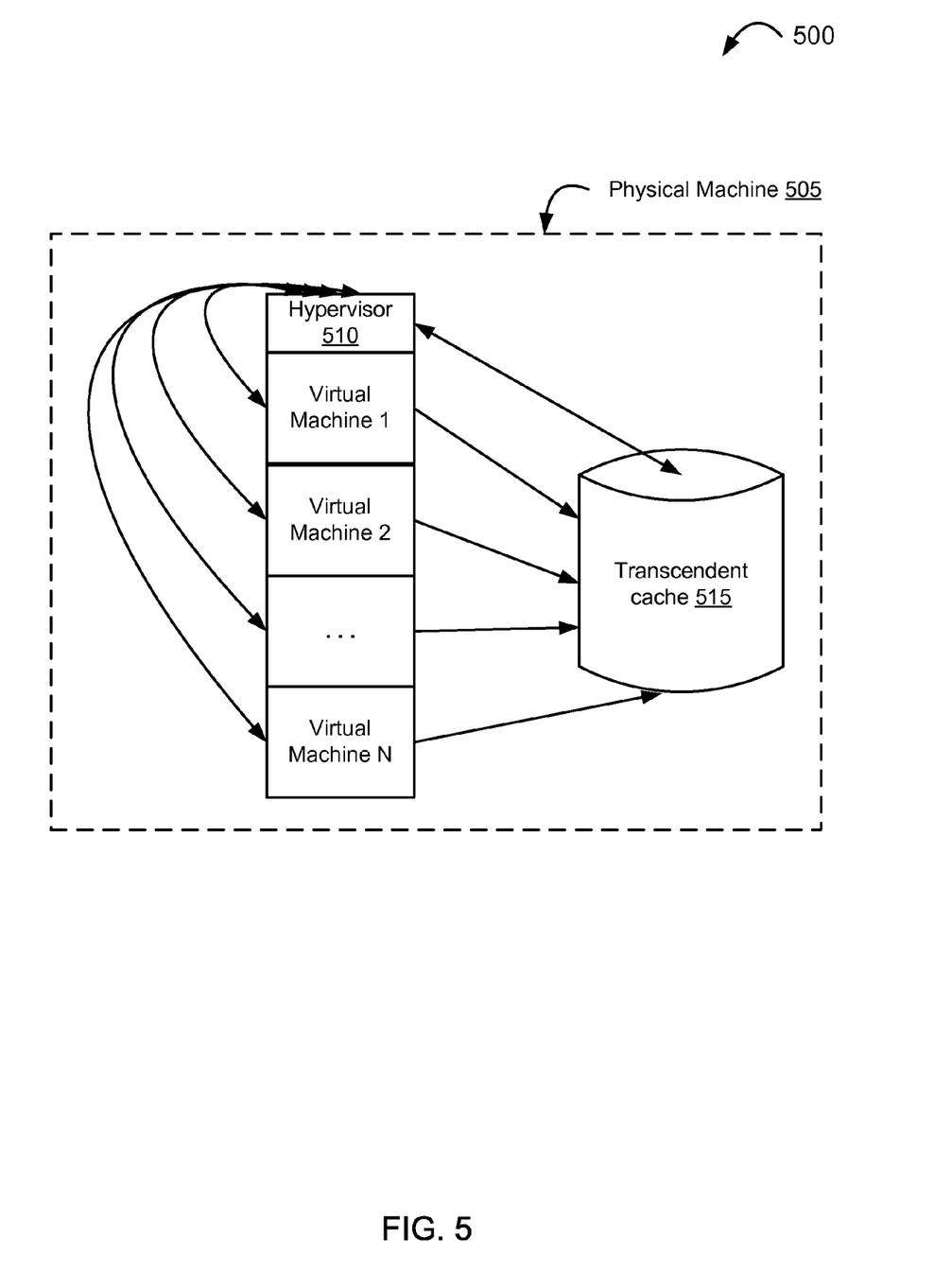
FIG. 5 is a block diagram illustrating a system for implementing transcendent page caching, according to embodiments of the present invention.

FIG. 1 provides a schematic illustration of one embodiment of a computer system 100 that can perform the methods of the invention, as described herein, and/or can function, for example, as any part of physical machine 505 in FIG. 5. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation one or more general-purpose processors and/or one or more special-purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network-accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 100 might also include a communications subsystem 130, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation dynamic memory, such as the working memory 135. Transmission media includes coaxial cables, copper wire and fiber optics, including the wires that comprise the bus 105, as well as the various components of the communication subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 105 retrieves and executes the instructions. The instructions received by the working memory 135 may optionally be stored on a storage device 125 either before or after execution by the processor(s) 110.

Figure 2:
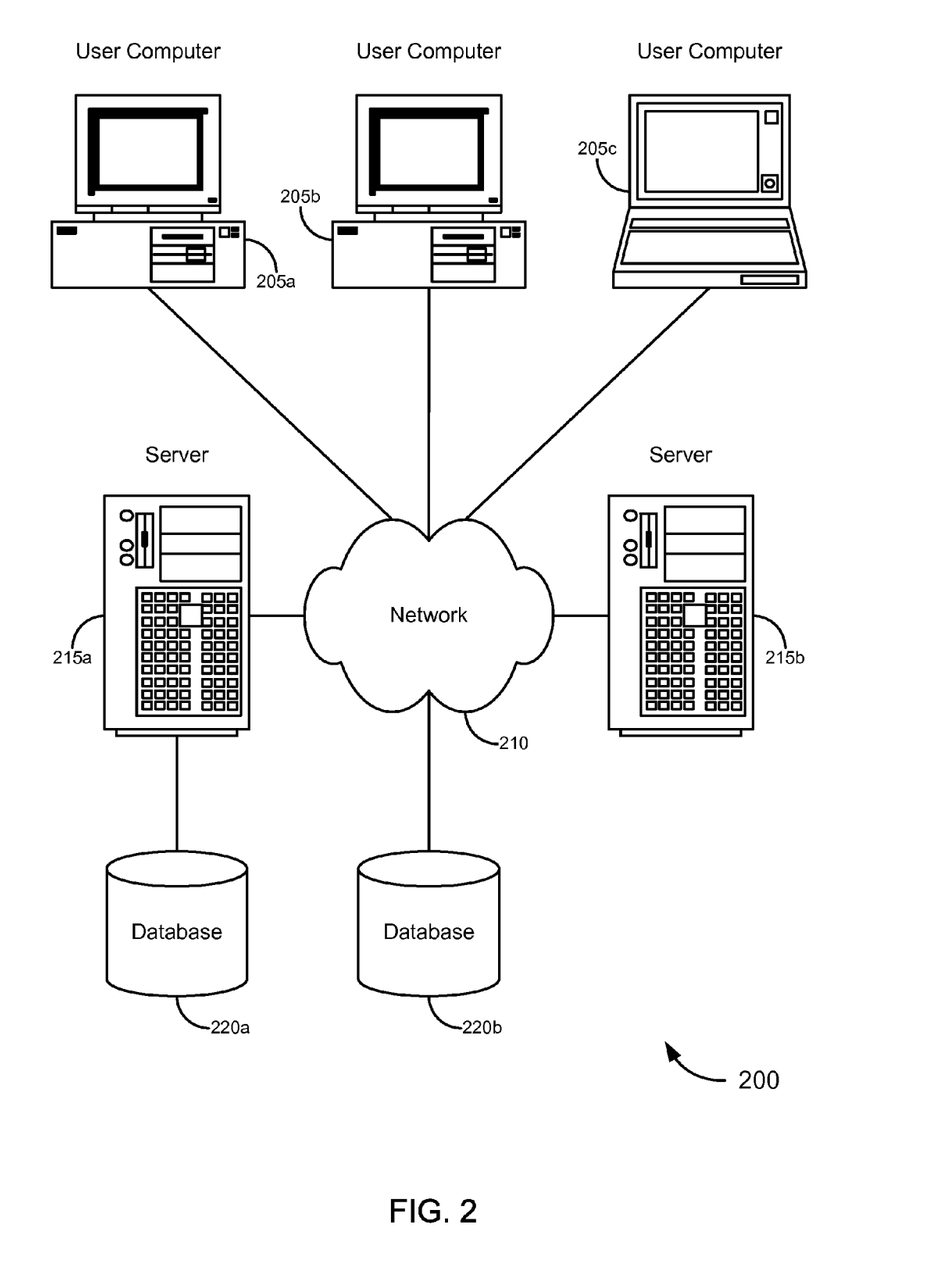
FIG. 2 is a block diagram illustrating a networked system of computers, which can be used in accordance with various embodiments of the invention.

A set of embodiments comprises systems for implementing physical machine 505 in FIG. 5. In one embodiment, user computers 205 and/or servers 215 may be implemented as computer system 100 in FIG. 1. Merely by way of example, FIG. 2 illustrates a schematic diagram of a system 200 that can be used in accordance with one set of embodiments. The system 200 can include one or more user computers 205. The user computers 205 can be general purpose private computers (including, merely by way of example, private computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or private digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially-available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary: merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

Figure 3A:
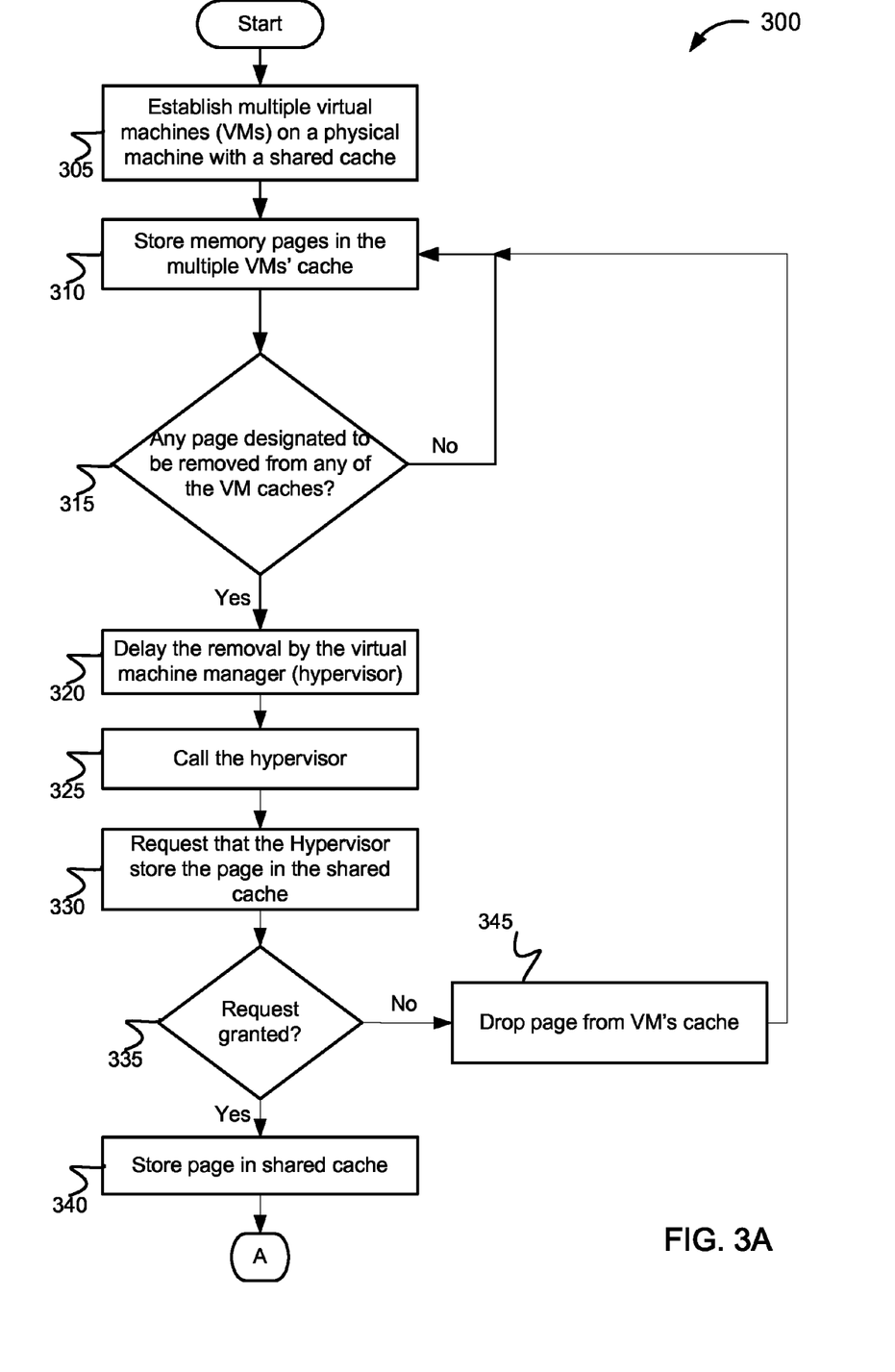
FIGS. 3A and 3B are flow diagrams illustrating transcendent page caching, according to embodiments of the present invention.

FIG. 3A illustrates a method 300 of performing transcendent page caching, according to embodiments of the present invention. At process block 305, multiple virtual machines (VMs) are established on a physical machine. In one embodiment, the physical machine may be system 100 from FIG. 1, user computer 205a, 205b, or 205c (FIG. 2), or server 215a or 215b (FIG. 2). Accordingly, the physical machine may be any computing device capable of hosting a number of VMs. Furthermore, the VMs may be established in such a way that each VM utilizes a portion of the physical machines resources (i.e., memory, disk, CPU, etc.) to operate the VM. As such, the physical machine may have additional resources remaining after allocation of resources to the VMs is completed. In one embodiment, those additional resources may be used as a shared cache.

In one embodiment, a shared cache consists of a space in the physical machine's memory that may be accessed and/or utilized by any of the VMs indirectly through a programming interface or via a method other than the normal direct memory access instructions supported by the processor. For example, a VM may be utilizing all of their resources (i.e., using to capacity the VM's private cache) and may be able to access the shared cache in order to supplement their limited resources. By accessing cache items (e.g., memory pages) as opposed to accessing the items on a disk storage, performance can be significantly increased. Hence, the more cache a VM has, the better the performance of the VM. Accordingly, based on various techniques and algorithms in the art, a VM caches memory pages which will be of greatest importance (i.e., memory pages which will most likely be accessed again in the future) in its private cache (process block 310), in order to avoid having to retrieve the memory pages from disk.

Further, because each VM's private cache has a finite size, eventually the cache will be filled, and in order to make room for additional (more important) memory pages, some memory pages are removed from the cache. As such, at decision block 315, a determination is made whether any memory pages in the private caches have been designated to be removed. If no pages in any of the VMs' private caches have been designated to be removed, then memory pages are continued to be stored in the private caches until one or more are designated to be removed.

As such, once a memory page has been designated to be removed from one or more of the VMs' private caches, the removal is delayed by a virtual machine shared cache manager (or hypervisor) (process block 320). In one embodiment, the hypervisor may be a module which has access to the shared cache as well as each of the VMs' private caches. Furthermore, the hypervisor may be configured to manage the memory and resource allocations from each of the VMs.

Figure 3B:
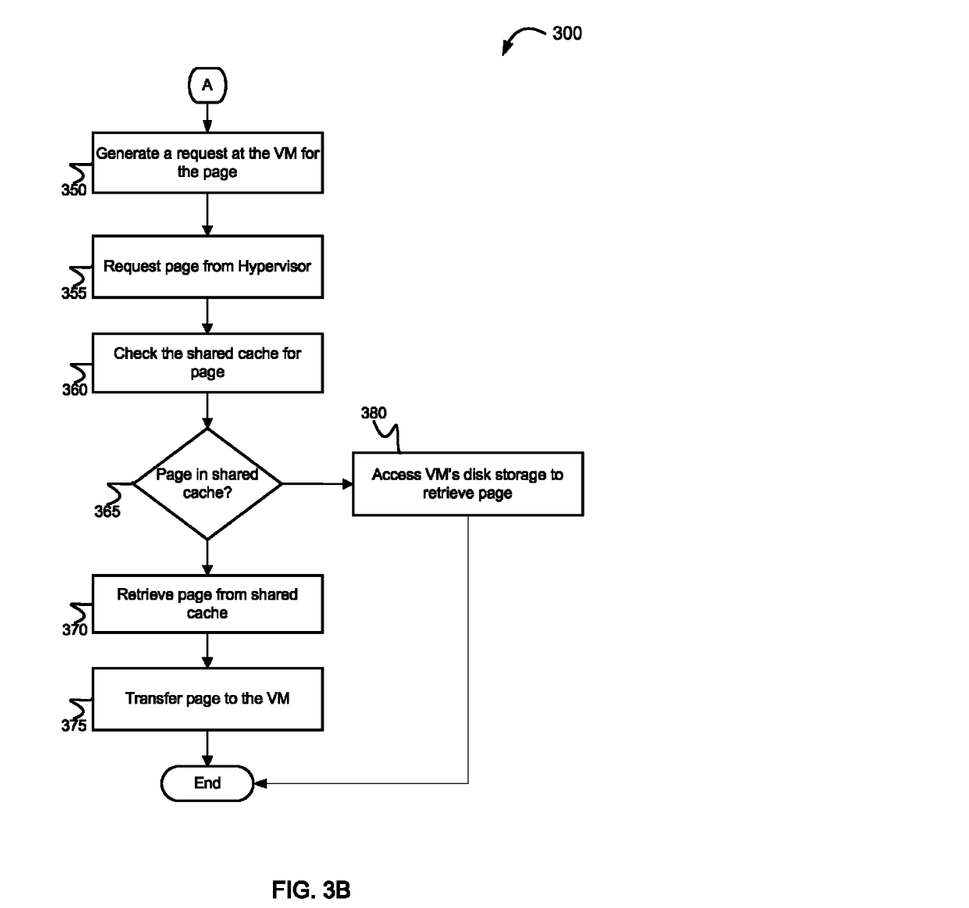
Figure 3C:
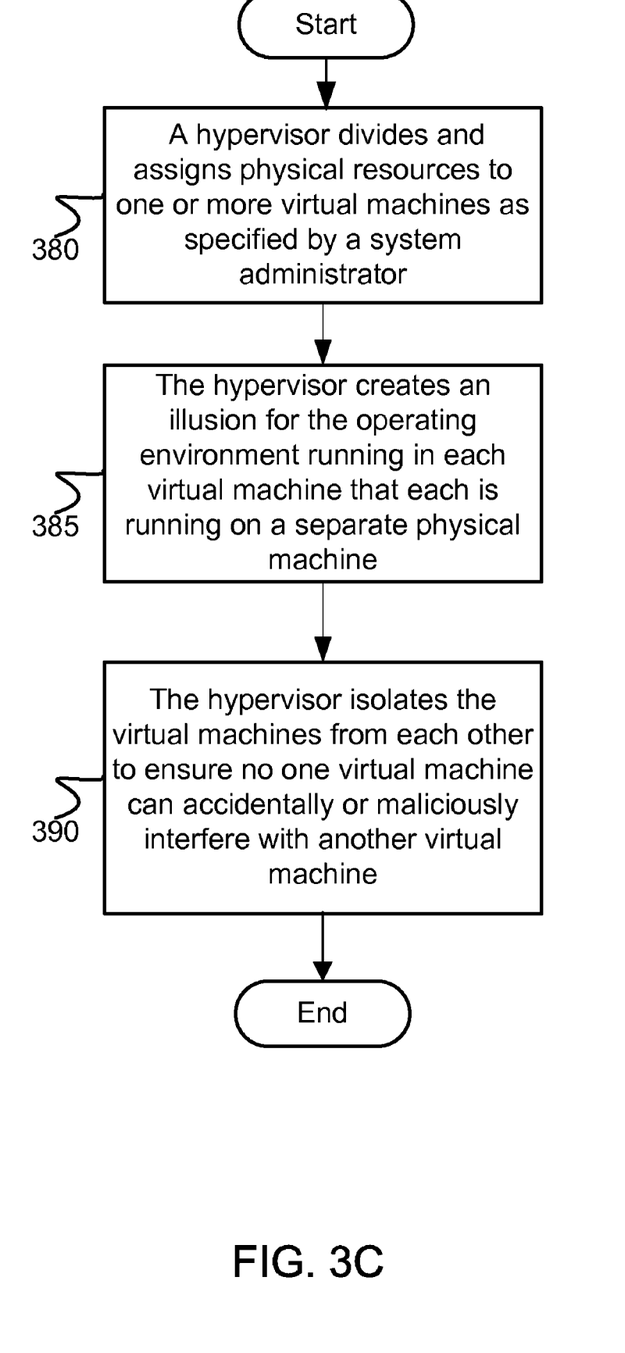
FIG. 3C is a flow diagram illustrating operations of a hypervisor, according to embodiments of the present invention.

Stepping away to FIG. 3C, which illustrates operations of a hypervisor in accordance with aspects of the present invention. In one embodiment, a hypervisor is system software that manages physical resources of a physical machine. For example, at process block 380, the hypervisor divides and assigns physical resources to one or more virtual machines as specified by a system administrator. At process block 385, the hypervisor than creates an illusion for the operating environment running in each virtual machine that each is running on a separate physical machine. At process block 390, the hypervisor isolates the virtual machines from each other to ensure no one virtual machine can accidentally or maliciously interfere with another virtual machine.

The delay of removing the memory page triggers a call to the hypervisor (process block 325), and a request is made that the hypervisor allow the memory page designated for removal from the VM's private cache to be stored in the shared cache (process block 330). The decision whether to allow the memory page to be stored in the shared cache may take into consideration a number of factors. For example, a usage history for each VM may be maintained by the hypervisor which tracks how often each VM requests and/or stores memory pages in the shared cache. Such information can assist the hypervisor in regulating usage of the share cache by any one VM, and ensure that proper load balancing among the VMs is maintained.

Additional factors may include the usefulness of the memory page to be stored, or the usefulness of the page in comparison to other pages being requested to be stored in the shared cache, or parameters specified by a system administrator. The memory space available in the shared cache may also be a factor. Ultimately, the hypervisor is configured to act as a gatekeeper to the shared cache to ensure that each VM running on the physical machine has balanced access to the shared cache.

Accordingly, at decision block 335, it is determined whether the request to store the memory page in the shared cache is granted. If the request is denied, then at process block 345, the page is dropped from the requesting VM's private cache, and new memory pages are continued to be stored in the VM's private cache to replace the dropped page (see process block 310). However, if the request is granted, then at process block 340, the memory page is stored in the shared cache by the hypervisor.

Furthermore, as the VMs continue to perform their designated operations (e.g., launching applications, storing files, deleting files, executing services, etc.), the VMs will need to access cached memory pages. Referring now to FIG. 3B, which continues method 300 from point A. At process block 350, the VM which stored the memory page in the shared cache generates a request for the stored memory page. Accordingly, in order to access the memory page, the VM requests the page from the hypervisor (process block 355). However, because page storage requests to the shared cache are received by the hypervisor from multiple VMs, not all memory pages stored in the shared cache are able to remain there indefinitely. After a given amount of time, pages from the shared cache may be removed in order to make room from other memory pages. Such decisions are made by the hypervisor in order to afford all VMs balanced access to shared cache.

Hence, the shared cache is checked by the hypervisor to determine if the requested memory page is still stored within the shared cache (process block 360). At decision block 365, it is determined whether the page is stored within the shared cache. If it is determined that the memory page is not stored within the shared cache, then at process block 380, the VM is indicated as such, and the VM accesses the VM's disk storage to retrieve the requested memory page. However, if the page is stored in the shared cache, then at process block 370, the hypervisor retrieves the page from the shared cache. Further, at process block 375, the retrieved page is transferred to the requesting VM for usage by the VM, thus, saving the VM from needing to retrieve the page from the much slower disk storage.

Figure 4:
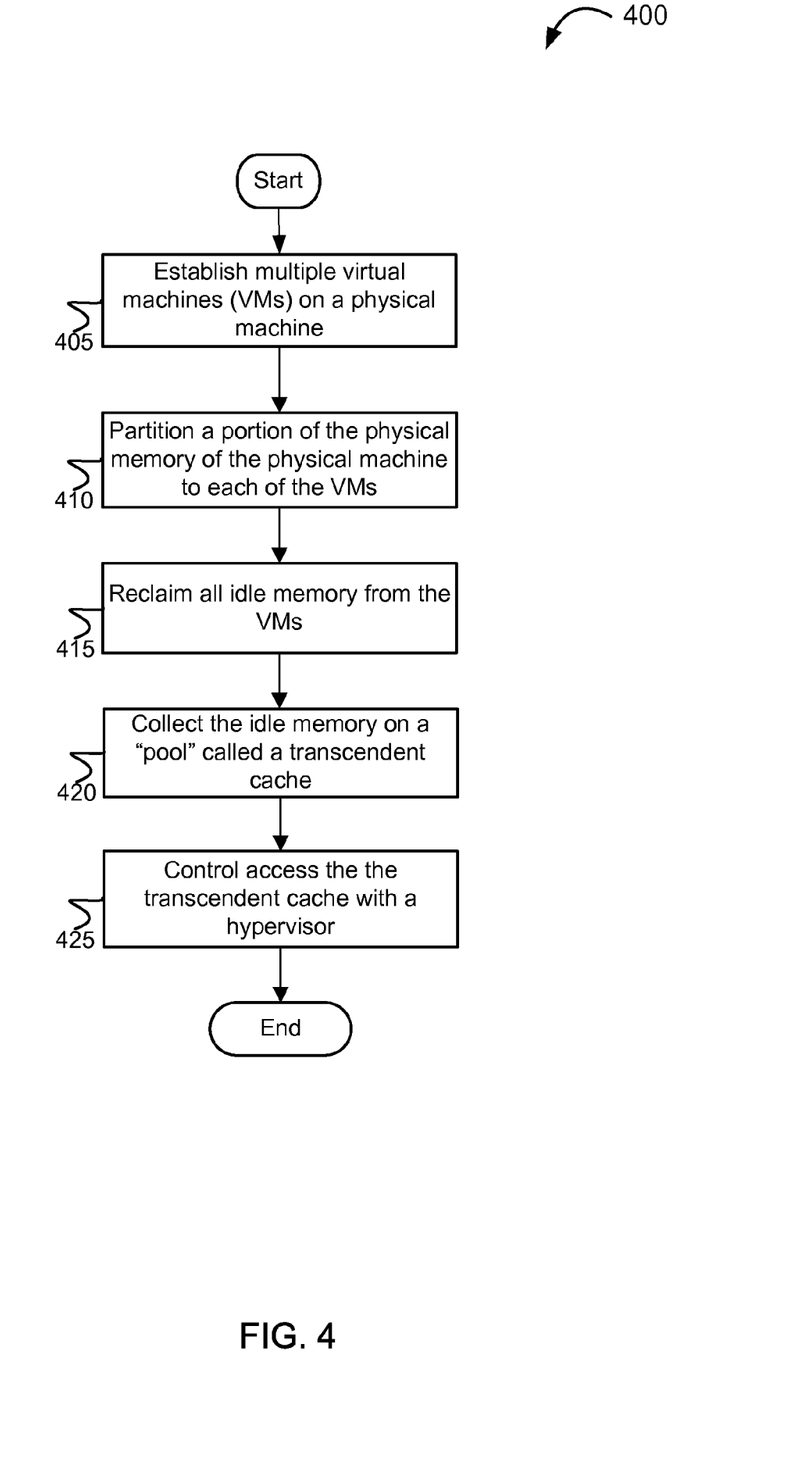
FIG. 4 is a flow diagram illustrating transcendent page caching, according to a further embodiment of the present invention.

FIG. 4 illustrates a method 400 of implementing transcendent page caching according to embodiments of the present invention. At process block 405, multiple VMs may be similarly established on a physical machine. Furthermore, a portion of the physical memory of the physical machine is partitioned for use by the multiple VMs (process block 410). Accordingly, each VM is allocated a certain amount of memory from the physical machine for use in the VM's private cache; however, at any given time at least a portion of the allocated memory may be idle. For example, one or more of the VMs may be performing few or no functions such that some or all of their allocated memory is idle (i.e., available).

Oftentimes, while some VMs sit idle, other VMs are working at maximum capacity utilizing all of their allocated recourses; however, in normal circumstances, the active VMs cannot access the unused resources from the idle VMs, and as such the resources are wasted. Nonetheless, in a shared (or transcendent) cache, according to aspects of the present invention, through the use of the hypervisor, the idle memory is reclaimed and used in the transcendent cache (process block 415).

At process block 420, the reclaimed idle memory is collected into a "pool" of shared memory which can then be accessed by the VMs running on the physical machine. Accordingly, the size of the transcendent cache varies as the amount of idle memory available changes. Furthermore, access to the transcendent cache is judiciously controlled by the hypervisor (process block 425). Similar to aspects described in method 300, the hypervisor grants or denies requests to use the transcendent cache, and equally allows VMs to use the shared cache. As such, the otherwise wasted memory is efficiently used by other VMs which are in need of additional resources.

In an alternative embodiment, this transcendent cache allocation scheme may be implemented in any environment where shared resources are present. For example, in a server pool (or farm) which pool resources, the idle (or unused) resources may be captured and access to them may be controlled/allocated by a hypervisor.

Turning now to FIG. 5, a system 500 is illustrated for implementing transcendent page caching according to embodiments of the present invention. In one embodiment, system 500 may include a physical machine 505. In one embodiment, physical machine 505 may include a hypervisor 510, virtual machines (VMs) 1-N and a transcendent page cache 515. Each of VMs 1-N are allocated a portion of physical machine 505's memory (not shown) to be used as the VMs' private caches. However, as discussed above, the VMs 1-N do not use all of the allocated memory at all time, some of the memory is idle. Therefore, the idle memory is used by hypervisor 510 to create transcendent cache 515.

As such, as VMs 1-N are in need of additional cache space to store memory pages, VMs 1-N can request that hypervisor 510 allow them to store those pages in transcendent cache 515. Such a store may be executed using a put( ) command or similar such command. Furthermore, when any of VMs 1-N need to access a stored page(s) in transcendent cache 515, the VM can execute a get( ) command, or similar such command. Such a command will request that hypervisor 510 access the requested page and transfer it to the requesting VM.

In a further embodiment, after a VM has successfully stored a memory page in transcendent cache 515, the VM may subsequently delete the content of the stored memory page (e.g., delete the file, the address reference, etc.), and as such, the page will be stale (or outdated) and will need to be removed. Accordingly, when the content of the page is deleted by the VM, the VM sends a request for hypervisor 510 to execute a flush( ) or similar command on the memory page. Hence, the stale page will not inadvertently be accessed and cause a data consistency error among other similar types of errors.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A computer implemented method of implementing transcendent page caching, the method comprising:
    establishing a plurality of virtual machines on a physical machine, wherein each of the plurality of virtual machines includes a private cache, and wherein a portion of each of the private caches is used to create a shared cache maintained by a hypervisor, wherein the hypervisor is configured to manage physical resources of the physical machine, divide and assign the physical resources to the plurality of virtual machines as specified by a system administrator, creates an illusion for an operating environment running in each of the plurality of virtual machines that each is running on a separate physical machine, and isolate the virtual machines from each other to ensure no one virtual machine interferes with another virtual machine;
    storing memory pages in the plurality of virtual machines' private caches;
    determining that at least one of the stored memory pages has been designated to be removed from one of the plurality of virtual machines' private caches;
    delaying the removal of the at least one of the stored memory pages;
    analyzing a plurality of factors to determine if the at least one of the stored memory pages in the shared cache should be removed or stored, wherein the plurality of factors includes a usage of the at least one of the stored memory pages, total memory space available in the shared cache, and load balancing between the plurality of virtual machine's use of the shared cache;
    based on the analysis of the plurality of factors by the hypervisor, storing the at least one of the stored memory pages in the shared cache;
    requesting, by one of the plurality of virtual machines, the at least one of the stored memory pages from the shared cache;
    determining that the at least one of the stored memory pages is stored in the shared cache; and
    transferring the at least one of the stored shared memory pages to the one of the plurality of virtual machines.

2. The method of claim 1, wherein the shared cache is created using idle portions of the plurality of virtual machines' private caches.

3. The method of claim 1, further comprising determining that the request to store the at least one memory page in the shared cache is denied.

4. The method of claim 3, further comprising dropping the at least one memory page from the one of the plurality of virtual machines' private caches.

5. The method of claim 1, further comprising determining that the requested at least one of the stored memory pages is not stored in the shared cache.

6. The method of claim 5, accessing a disk storage to retrieve the requested at least one of the stored memory pages in response to the requested at least one of the stored memory pages not being stored in the shared cache.

7. The method of claim 1, wherein the hypervisor is configured to control access by the plurality of virtual machines to the shared cache.

8. The method of claim 7, wherein the hypervisor is further configured to determine the shared cache's size allocation.

9. The method of claim 8, further comprising reallocating, by the hypervisor, the shared cache's size, based at least in part on the plurality of the virtual machines' private caches' level of idleness.

10. The method of claim 1, further comprising determining if a private copy of the requested at least one of the stored memory pages in the shared cache has changed so that it differs from the stored memory pages in the shared cache.

11. The method of claim 10, further comprising purging the requested at least one of the stored memory pages from the shared cache, in response to a private copy of the requested at least one of the stored memory pages being changed.

12. The method of claim 10, further comprising retrieving the requested at least one of the stored memory pages from the shared cache, in response to the requested at least one of the stored memory pages from the shared cache not having a private changed copy.

13. The method of claim 1, wherein the hypervisor performs one or more of the following operations: a shared cache put, a shared cache get, and a shared cache flush.

14. The method of claim 1, further comprising deleting, by one of the plurality of virtual machines, at least one memory page from the at least one of the virtual machine's storage which is also stored in the shared cache.

15. The method of claim 14, further comprising calling the hypervisor to flush the at least one memory page from the shared cache, in response to the one of the plurality of virtual machines deleting the at least one memory page.

16. The method of claim 1, further comprising limiting, by the hypervisor, each of the plurality of virtual machines' usage of the shared cache.

17. The method of claim 16, wherein the limiting is based at least in part on one or more of the following: a total amount of idle memory, each of the virtual machines' shared cache usage history, a number of virtual machines, and a total number of available physical memory.

18. A non-transitory machine-readable medium for implementing transcendent page caching, the machine-readable medium including sets of instructions stored thereon which, when executed by a machine, cause the machine to:
    establish a plurality of virtual machines on a physical machine, wherein each of the plurality of virtual machines include a private cache, and wherein a portion of each of the private caches is used to create a shared cache maintained by a hypervisor wherein the hypervisor is configured to manage physical resources of the physical machine, divide and assign the physical resources to the plurality of virtual machines as specified by a system administrator, creates an illusion for an operating environment running in each of the plurality of virtual machines that each is running on a separate physical machine, and isolate the virtual machines from each other to ensure no one virtual machine interferes with another virtual machine;
    store memory pages in the plurality of virtual machines' private caches;
    determine that at least one of the stored memory pages has been designated to be removed from one of the plurality of virtual machines' private caches;
    delay the removal of the at least one of stored memory pages;
    analyze a plurality of factors to determine if the at least one of the stored memory pages in the shared cache should be removed or stored, wherein the plurality of factors includes a usage of the at least one of the stored memory pages, total memory space available in the shared cache, and load balancing between the plurality of virtual machine's use of the shared cache;

based on the analysis of the plurality of factors by the hypervisor, store the at least one of stored memory pages in the shared cache;

request, by one of the plurality of virtual machines, the at least one of the stored memory pages from the shared cache;

determine that the at least one of the stored memory pages is stored in the shared cache; and transfer the at least one of the stored shared memory pages to the one of the plurality of virtual machines.

19. The non-transitory machine-readable medium of claim 18, wherein the shared cache is created using idle portions of the plurality of virtual machines' private caches.

20. The non-transitory machine-readable medium of claim 18, further comprising determining that the request to store the at least one memory page in the shared cache is denied.

* * * * *

UNITED STATES PATENT AND TRADEMARK OFFICE
CERTIFICATE OF CORRECTION

PATENT NO. : 8,769,206 B2
APPLICATION NO. : 12/716441
DATED : July 1, 2014
INVENTOR(S) : Magenheimer Page 1 of 1

It is certified that error appears in the above-identified patent and that said Letters Patent is hereby corrected as shown below:

In the Specification:

In column 4, line 24, delete "and or" and insert -- and/or --, therefor.

Signed and Sealed this
Third Day of March, 2015

Michelle K. Lee
*Deputy Director of the United States Patent and Trademark Office*